United States Patent
Samayoa et al.

(10) Patent No.: US 6,745,672 B1
(45) Date of Patent: Jun. 8, 2004

(54) TRANSPORT MODULE FOR HANDLING SOFTENED DOUGH INTERMEDIATES

(75) Inventors: Jeffrey A. Samayoa, Minneapolis, MN (US); Jeffrey L. Casper, Minneapolis, MN (US); J. Kofi A. Mensah, Mounds View, MN (US); Dennis B. Usgaard, Crystal, MN (US); Bruce W. Robb, St. Louis Park, MN (US); James W. Finkowski, Andover, MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 10/295,168

(22) Filed: Nov. 15, 2002

(51) Int. Cl.⁷ .............................. A23L 1/00; A23P 1/00; A21C 5/00; A21C 11/04; A21C 11/10
(52) U.S. Cl. ...................... 99/353; 99/450.1; 99/450.2; 425/376.1; 425/378.1
(58) Field of Search ........................... 99/349, 352–355, 99/494, 516, 450.1–450.8, 483; 425/190, 197, 92, 94, 198, 239, 378.1, 376.1, 394, 398, 406, 457, 307, 308, 310, 105, 215; 118/14, 15, 18, 209, 216; 426/516, 518, 523, 241, 242, 383, 496; 198/831, 837, 841, 852

(56) References Cited

U.S. PATENT DOCUMENTS

| | | | | |
|---|---|---|---|---|
| 3,754,464 A | * | 8/1973 | Kaufman et al. ............. | 99/334 |
| 4,417,867 A | * | 11/1983 | Bauer ......................... | 425/394 |
| 4,435,144 A | * | 3/1984 | Kemper ...................... | 425/332 |
| 4,494,920 A | * | 1/1985 | Anderson ................... | 425/190 |
| 4,742,907 A | * | 5/1988 | Palmaer ...................... | 198/831 |
| 4,922,811 A | * | 5/1990 | Stumpf ..................... | 99/443 C |
| 5,049,711 A | * | 9/1991 | August ....................... | 219/680 |
| 5,121,677 A | * | 6/1992 | Le Claire et al. ............ | 99/357 |
| 5,162,119 A | * | 11/1992 | Pappas et al. ................ | 425/92 |
| 5,546,850 A | * | 8/1996 | Zaveri ......................... | 99/349 |
| 5,630,358 A | * | 5/1997 | Patel .......................... | 99/349 |
| 5,914,148 A | * | 6/1999 | Kazemzadeh ............... | 426/516 |
| 5,947,173 A | | 9/1999 | Miyamoto | |
| 6,158,315 A | * | 12/2000 | Nowotny et al. ............ | 83/23 |

FOREIGN PATENT DOCUMENTS

| | | |
|---|---|---|
| DE | 4131107 | 3/1993 |
| EP | 1099379 | 5/2001 |
| EP | 791293 | 9/2002 |
| GB | 1211536 | 11/1970 |
| JP | 10056944 | 3/1998 |
| WO | 93/13668 | 7/1993 |

* cited by examiner

*Primary Examiner*—Timothy F. Simone
(74) *Attorney, Agent, or Firm*—Douglas J. Taylor; Michael C. Maier; John A. O'Toole

(57) ABSTRACT

The present invention is directed to an improved apparatus for processing dough intermediates that are less developed, softer or which have enhanced water or moisture levels. More specifically, the present invention relates to the use of an improved dough transport module, that has one or more protuberances extending generally perpendicularly from a supporting surface which supports the dough intermediate for a sufficient interval of time during processing so as to eliminate the waste and loss of dough intermediates prior to processing or packaging steps.

24 Claims, 6 Drawing Sheets

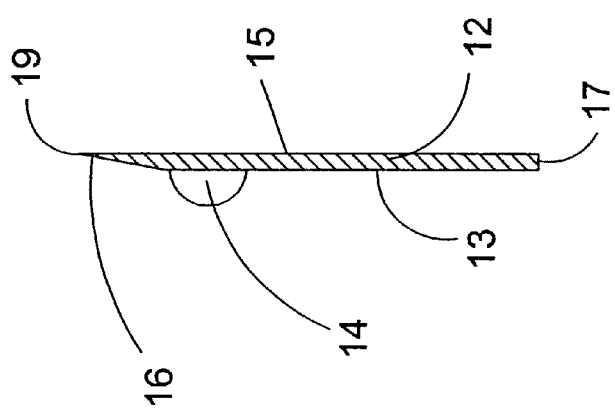
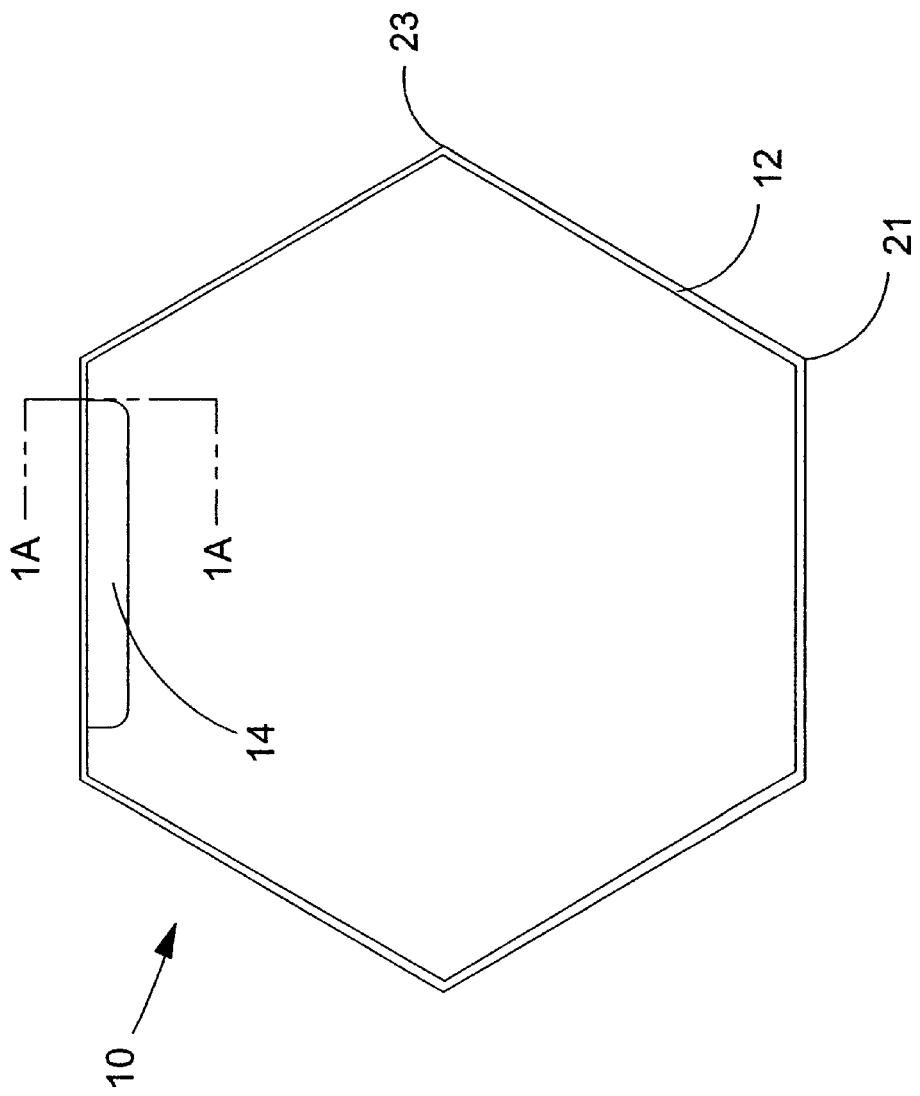

TRANSPORT MODULE FOR HANDLING SOFTENED DOUGH INTERMEDIATES

CROSS-REFERENCES TO RELATED APPLICATIONS

None.

FIELD OF THE INVENTION

The present invention is directed to an apparatus for handling loose dough intermediates, such as moisture enhanced, softer and/or less developed dough. The apparatus of the present invention reduces the fallout of the intermediates formed from this dough so as to avoid unintentional loss or waste and machine downtime occasioned by dough intermediates falling out of the processing line prior to packaging or further treatment or handling.

BACKGROUND OF THE INVENTION

The present invention is directed to an improved apparatus for processing dough intermediates that are less developed, softer or which have enhanced water or moisture levels. More specifically, the present invention relates to the use of an improved dough transport module, that is incorporated into a cutter bar configuration and that has one or more protuberances extending generally perpendicularly from a supporting surface which supports the dough intermediate for a sufficient interval of time during processing so as to eliminate the waste and loss of dough intermediates prior to processing or packaging steps.

The production of food products on a commercial scale presents constant challenges to the manufacturer in achieving economies and the consumer in obtaining acceptable products. The manufacturer attempts to extract processing efficiencies while at the same time achieving an end product that is suitable for consumers. The consumer on the other hand, looks for a food product that evokes a feeling of having created the product from "scratch" (through the appearance provided by the product, as well as the olfactory and organoleptic properties) but yet be easy to prepare and serve.

One of the problems for the manufacturer in meeting the challenges presented by these conflicting needs, aside from potential increases in costs due to improving ingredient quality, is usually related to the difficulties in preparing and processing the dough intermediates. That is, the dough and dough intermediates are typically more difficult to handle and can range from a stickier dough to a more "loose" dough or suffer from other problems from which conventional processing equipment cannot readily accommodate. While the dough intermediates needs to be retained in the processing apparatus, it also needs to release readily from the apparatus in order to complete the necessary manufacturing steps.

Another problem faced by the manufacturer is that fragile and deformable products such as dough and dough intermediates as well as the resulting finished product will show visible scars or distresses as a result of rough handling. As such, the manufacturer needs to treat such material gently so as not to create an aesthetically displeasing product.

In order to provide the consumer with more desirable and flavorful biscuits, such as one having improved texture, fluffiness and moisture, it has been found, for example, that it is necessary to change or increase the level of moisture in the dough. However, increasing the level of moisture typically causes difficulties in processing the dough intermediates as well as subsequently filling the dough cans or other packaging adapted to handle the dough. It is believed that this problem results from the dough having higher flowability, or being looser, due to the increased moisture level or water content, and as such can be more difficult to handle during processing.

It has been found that when using conventional dough handling equipment, the enhanced moisture dough, or loose dough has a tendency to fall or drop out of the dough processing equipment prematurely. The vibrations of the equipment cause the dough fill cups to empty as the cups advance through the various processing steps to the package filling equipment that will distribute the dough intermediates to the waiting dough packages.

Some of the drawbacks associated with processing doughs or dough intermediates that have premature fallout, such as those dough intermediates that are more loose than conventional dough products, include containers or packages that are not completely filled (as the dough fallouts before reaching the packaging station) deformation or irregularities in the dough intermediate or the final product produced from such intermediate (due to the addition of gripping appliances to hold the dough in position) and process or machine clogging and downtime to clean or adjust the apparatus.

Typically, dough and dough intermediates have a tendency to be increasingly sticky and as such there has been a regular and constant development to reduce the amount of contact (surface area of the equipment) between the dough processing apparatus and the dough itself in order to avoid cleaning and handling difficulties. It has been surprisingly been found that by increasing the surface area of the transport modules through at least the packaging stations, that enhanced dough or dough intermediates that have such increased moisture levels can reach the packaging and post forming processing areas without the problems associated with premature fallout of the dough or dough intermediates. However, such gripping devices cannot be overtly aggressive as the devices can distort the appearance of the dough product. In addition, increasing the size of the cups used in transporting the dough intermediates add an excessive amount of weight to the apparatus, causing additional wear and tear on the equipment.

What is therefore needed is an enhanced apparatus for handling softened, moisture enhanced or other difficult to handle dough that does not add additional complexity to the processing apparatus but still provides an efficient and effective apparatus to deliver the dough or dough intermediates to the packaging or other post formation treatment steps.

BRIEF SUMMARY OF THE INVENTION

The present invention overcomes the foregoing drawbacks by placing a series of prearranged protuberances or extensions internally in a dough-processing module. The protuberances or extensions can be positioned at any point on the internal face of the walls of the modules, and extend perpendicularly from the walls to actively engage, but not detrimentally, the dough intermediates. The protuberances provide a temporary holding means to retain the moisture enhanced dough intermediate in the module for a sufficient amount of time to enable the plunger to remove the dough intermediate from the cup or module structure. The protuberances are placed in an area of the face of that is generally slightly away from the end edges of the device.

In one embodiment of the present invention, a dough intermediate transport module is described and comprises a substantially rigid outer frame. The rigid frame has a predetermined shape that corresponds to a prearranged configuration that aids in forming a finished dough product. The rigid frame further has an externally extending configuration and an internally arranged configuration. At least one protuberance is provided and extends substantially perpendicularly from the internally arranged configuration. The protuberance on the internally arranged configuration prevents a dough intermediate from falling out of the dough transport module prior to applying motive force to remove the dough intermediate from the dough transport module.

A still further embodiment of the present invention relates to dough intermediate transport module that has a plurality of generally planar surfaces. Each of the generally planar surfaces having first and second longitudinally extending side edges, first and second transversely extending end edges and first and second faces. The generally planar surfaces are connected one to another along one of the first and second longitudinally extending side edges to form a geometric configuration. At least one protuberance is provided and extends substantially perpendicularly from one of the first and second faces of one of the plurality of generally planar surfaces. The protuberance is disposed in an area of one of the first and second faces that is at least slightly away from one of the first and second transversely extending end edges and the protuberance aids in retaining a softened dough intermediate in the transport module during processing.

These and other objects of the invention will become clear from an inspection of the detailed description of the invention and from the appended claims.

BRIEF DESCRIPTION OF THE DRAWINGS

The foregoing and other objects and advantages of this invention, will be more completely understood and appreciated by referring to the following more detailed description of the presently preferred exemplary embodiments of the invention in conjunction with the accompanying drawings, of which:

FIG. 1 is a cross sectional view of a protuberance disposed on an internally configured arrangement of a dough transport module of the present invention;

FIG. 1A illustrates a generally planar surface of the present invention having first and second ends, one of which is tapered and further illustrating a protuberance disposed in an area not adjacent to one of the first and second ends;

DETAILED DESCRIPTION OF THE INVENTION

Figure 1B:
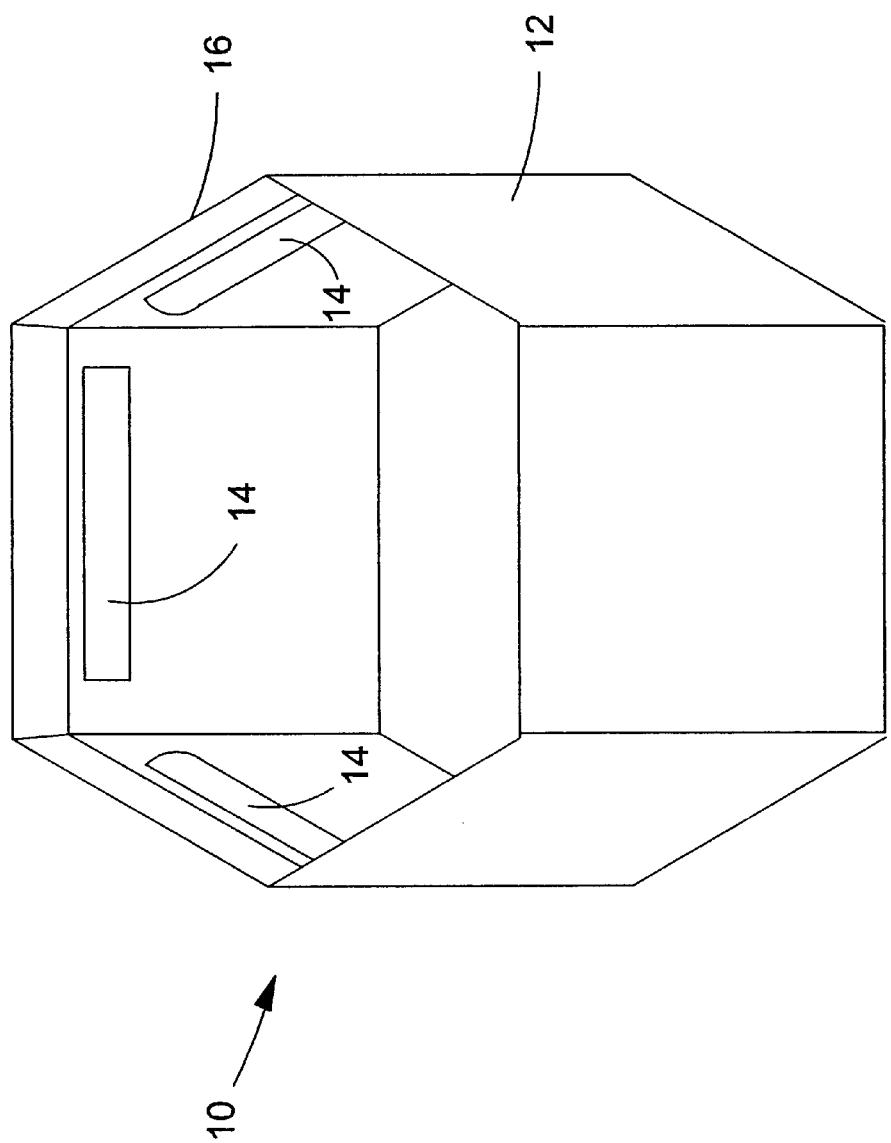
FIG. 1B provides a plan view of the present invention showing a number a protuberances disposed on each of the generally planar surfaces of the internally configured arrangements of a dough transport module of the present invention.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

As used herein, the term "intermediate" or "dough intermediate" refers to a dough product that is in an intermediate, physical step or phase and requires one or more further treatment or processing steps in order to complete the preparation of the finished product so that it is suitable for human or animal consumption. The additional treatment step may include, cooking, baking, heating, frying or the like, but is not to be construed as being limited thereto.

Turning now to FIG. 1, an exemplary embodiment of the module of the present invention is shown by reference to numeral 10. The module 10, here illustrated as a hexagon, is constructed from a number of generally planar walls 12. Each of the generally planar walls 12 (referring to FIG. 1A) has a first face 13 and a second face 15 as well as first and second transversely extending end edges 17 and 19 and first and second longitudinally extending side edges 21 and 23. A protuberance or extension 14 is shown attached to the first face 14 of the generally planar surface 12. The protuberance or extension 14 extends substantially, generally perpendicularly from the first face 13 of the generally planar surface 12 into the internal configuration of the transport module of FIG. 1 and is disposed so as not to be adjacent one of the first or second transversely extending end edges 17 and 19. The internal configuration is generally complimentary of the external configuration of the transport module 10.

Figure 3:
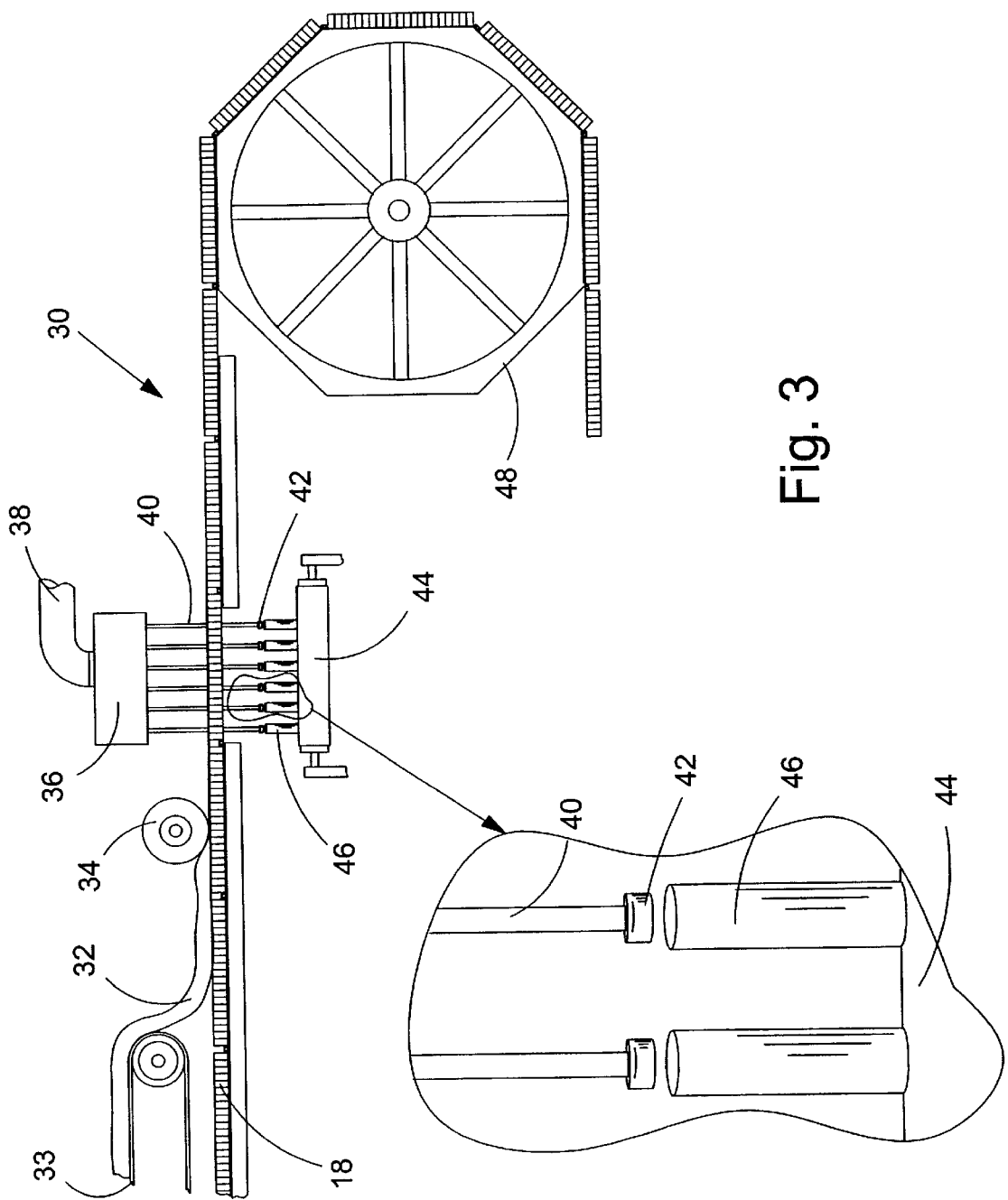
FIG. 3 illustrates a schematic of a dough and dough intermediate forming line as used in the present invention.

Also as illustrated in FIG. 1A, one of the first and second transversely extending end edges may be in the form of a tapered end 16 so as to permit ease of entry of the dough intermediate into the module 10. That is, the tapered end 16 serves as a cutting end or edge for the dough as it is pressed into the modules as illustrated in FIG. 3. A tapered end 16 may be provided on each of the generally planar surfaces 12 or only on predetermined surfaces, such as the leading or trailing edge depending on the direction the dough is being applied, or as according to the needs of the specific application such as to provide some aesthetic or other feature.

In a further embodiment of the present invention, a hexagonally shaped module 10 is illustrated in FIG. 1B and is provided with a series of protuberances 14, a total of six, only three of which are shown, on each of the generally planar surfaces 12 of the dough intermediate transport module 10. Obviously, if the module 10 were of a different geometric shape, i.e. square, round, pentagonal, triangle, heptagonal, etc. a different number of protuberances 14 may be provided.

Each of the protuberances 14 extends inwardly of the interior configuration (into the interior of the hexagon) and extends generally perpendicularly from the sidewall. The protuberance 14 extends a distance ranging from 1 to 4 mm with about 2–3 mm being preferred and from 2.5 mm to 3 mm being further preferred. The length of the protuberances ranges roughly from 20–30 mm and preferably about 22–27 mm but generally runs the width of the generally planar surface 12 or the width of the first and second transversely extending end edges 17 and 19. The transverse extension of the protuberance 14 is generally greater than half the width of the face 12 of the module 10. The width of the protuberance 14 is approximately 0.3 inches to 0.4 inches with roughly 0.35 inches being preferred. In one embodiment, the protuberance 14 is centered about one half inch from the end edge, specifically the end edge having the tapered end 16. The positioning of the protuberance 14 is desirably arranged to slow or reduce the egress of the dough intermediate out of the module 10 prior to being dispensed into the waiting dough containers.

The shape of the protuberances 14 themselves is not necessarily critical, however, in one embodiment of the present invention the shape of the protuberance is generally rounded so as to slightly grip and hold the dough intermediate, but not create a significant indentation, rip or other distortion in the dough. It has been found that the protuberances 14 extends from the planar surface 12 a distance of 2.5 mm to 3 mm successfully held the dough intermediates in the modules for approximately five minutes during downtime of the processing apparatus. The dough intermediates after preparation (cooking or baking) did not contain any detrimental defects (such as rips or distortions) caused by use of the protuberances as described above.

Figure 2:
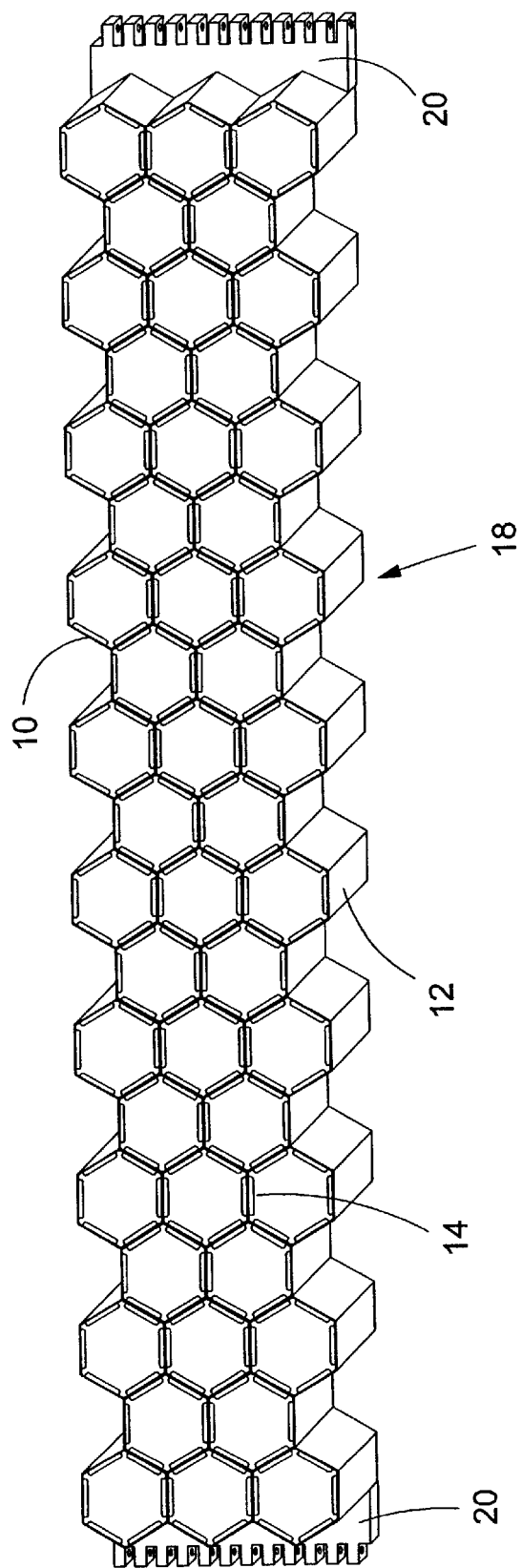
FIG. 2 provides an illustration of a plurality of modular transports affixed to one another to form a cutter bar in connection with the present invention.

Turning now to FIG. 2, a series of dough transport modules 10 are connected to one another at the second face 15 of the generally planar surface 12. The connection is achieved through spot welds (not shown) that may appear on the transverse end edges 13 and 15 of the modules 10. The attachment may also be accomplished through the use of clips, adhesives or other means that are suitable and provide adequate holding strength for the modules 10.

The arrangement of modules 10, as shown in FIG. 2 in a honeycomb appearance, has been incorporated into a cutter bar, which is designated generally by reference to numeral 18. In an exemplary embodiment, up to 48 modules or cups 10 may be included in each cutter bar. A series of cutter bars 18 may be connected end to end via a connection bar 20 to create an endless belt configuration. In one embodiment, there may be 38 cutter bars in a single endless belt unit. The connection bar 20 is used to couple one cutter bar 18 to the next and as illustrated the connection is completed through use of a dovetail type arrangement, which is held in position through the use of pins or bolts (not shown). Other connection configurations are possible such as tongue and groove, slotted configurations, etc. but the connection should be flexible so that the belt may be rotated around one or more axis's.

FIG. 3 is illustrative of a schematic apparatus, generally designated at 30, for processing the loose dough intermediates of the present invention. As illustrated, a series of cutter bars 18 are connected end to end to form an endless loop. The dough, illustrated by reference to numeral 32 is brought into contact with the cutter bars 18 by a conveyor 33, but other arrangements are possible, such as the use of an extruder, gravity feed hopper, etc.

The dough 32, upon reaching the cutter bars 18 is then carried by the endless belt formed by the cutter bars 18 and is then pressed via a compression roller 34 into the individual modules of the cutter bars 18. The tapered end 16 of each of the modules facilitates cutting of the dough and pressing the dough into each of the modules 10. The cutter bar 18 advances to a dispensing or packaging station 36 at which motive force 38 (for example a vacuum) is applied to a series of plungers 40 to press the dough 32 from the cutter bars 18 into waiting dough containers 46 such as dough cans and then withdraw the plungers from the containers 46. While dough cans are illustrated, obviously any sort of dough packaging may be used in connection with the present invention such as envelopes, flexible sleeves, boxes, and the like.

Each of the plungers 40 is provided with a ramming head 42 that is sized and configured to push the dough out of each of the individual modules and into the waiting dough containers 46. A conveyor belt 44 or other advancing mechanism is provided to continually supply empty dough containers 46 to the packaging area. The conveyor belt 44 also serves to support the dough containers 46. After the dough has been removed from the cutter bars 18 and the individual modules 10, the cutter bars 18 are advanced again by a drive means 48, illustrated in FIG. 3 as a drive wheel where the cutter bars 18 are then readied for another filling cycle.

After each of the dough containers has been filed, the conveyor 44 moves the filled containers off to a weighing station (not shown) to confirm that an adequate amount of dough or dough intermediates has been placed into the individual containers 46.

Figure 4:
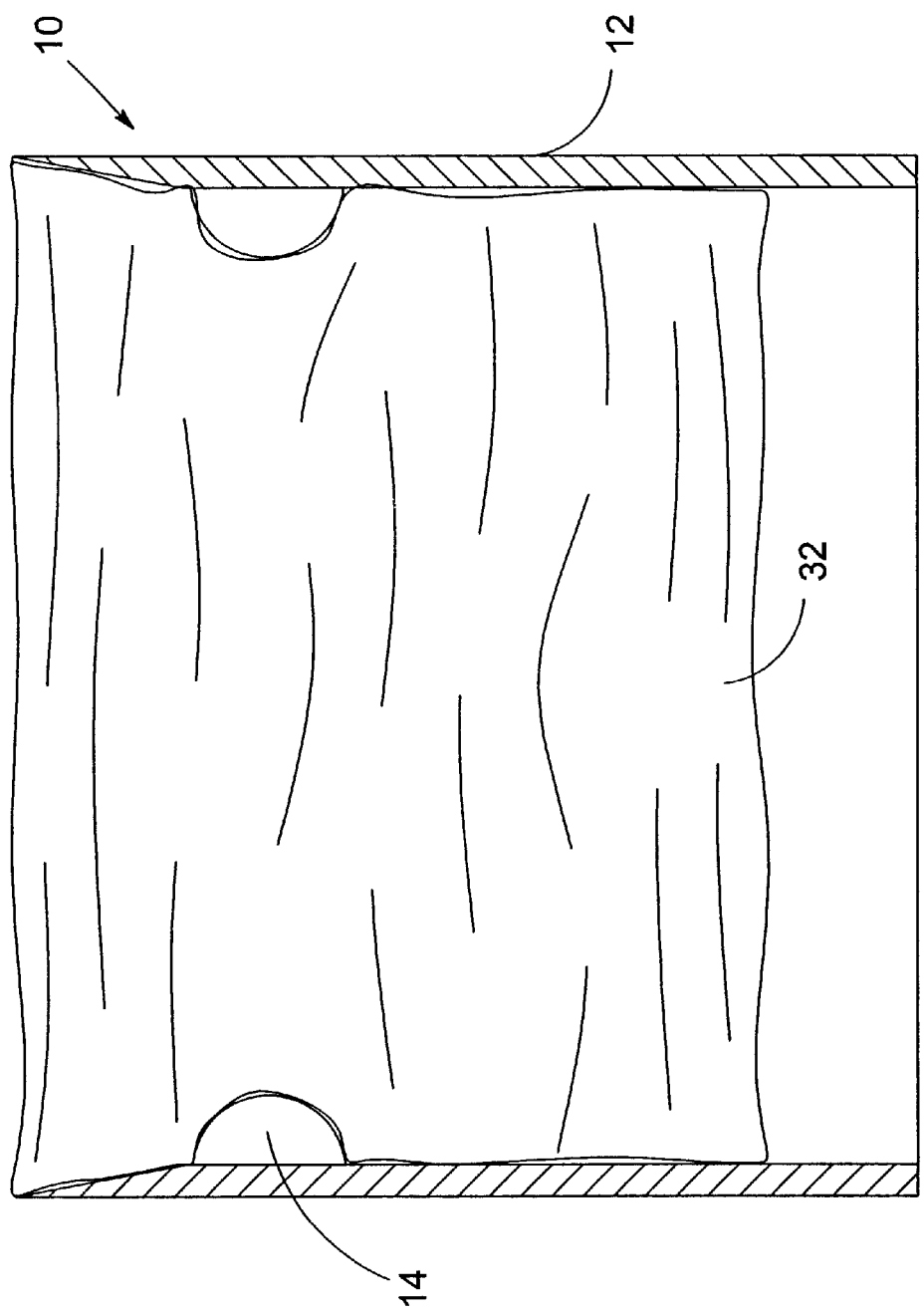
FIG. 4 shows a depiction of a dough intermediate positioned within a dough transport module.

Turning now to FIG. 4, the module 10 is illustrated in a filled condition showing the dough intermediate 32' being retained by at least a pair of generally perpendicularly extending protuberances 14. As shown in FIG. 4, a plurality of the protuberances 14 are used to hold the dough intermediate 32' in place.

Figure 5:
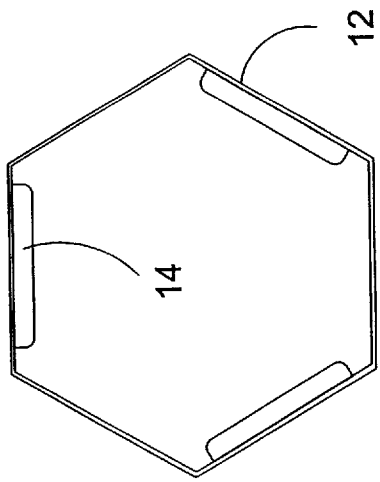
FIG. 5 illustrates a hexagonal dough transport module having protuberances on each of the generally planar surfaces.
Figure 8:
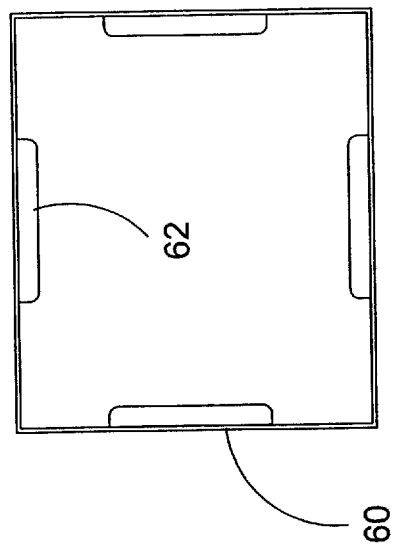
FIG. 8 provides a square dough transport module having protuberances on pre-selected surfaces.
Figure 6:
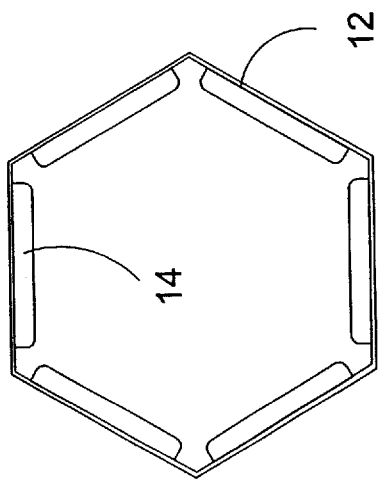
FIG. 6 depicts a hexagonal dough transport module having protuberances on alternate generally planar surfaces.
Figure 7:
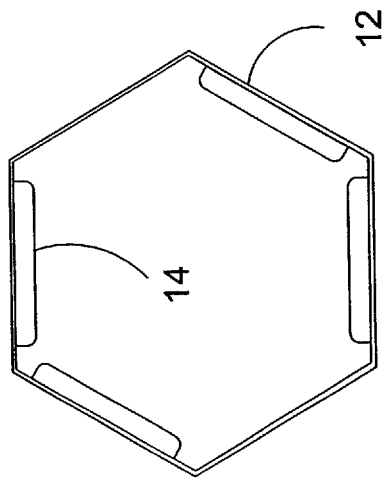
FIG. 7 provides a hexagonal dough transport module having protuberances on adjacent generally planar surfaces.

FIGS. 5 through 8 are other illustrative embodiments of the present invention and include exemplary uses of the protuberances 14 in various configurations, including having the protuberances 14 on each of the generally planar surfaces as shown in FIG. 5; alternate walls as illustrated in FIG. 6; on adjacent walls as provided in FIG. 7; and in an alternate geometric configuration in FIG. 8. It should be understood that the internal and external configuration of the modules 10 could be used in forming or creating the intended shape of the dough intermediate.

Ideally, the dough intermediates through use of the present invention should be able to be retained in each of the modules or cups 10 for at least five minutes.

The present invention is used for a variety of dough intermediates such as in the formation of biscuits, rolls, buns and the like, but can also be used for other dough intermediate applications such as for example cookies, pastries, bread, bars and the like.

It will thus be seen according to the present invention a highly advantageous dough intermediate module transport apparatus has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

What is claimed is:

1. A dough intermediate transport module, comprising;
   a substantially rigid outer frame, said rigid outer frame having a predetermined shape corresponding to a prearranged configuration that aids in forming a finished dough product, and said rigid outer frame further having an externally extending configuration and an internally arranged configuration;

at least one protuberance extending substantially perpendicularly from said internally arranged configuration; and wherein said protuberance on said internally arranged configuration prevents a dough intermediate from falling out of the dough transport module prior to applying motive force to remove the dough intermediate from the dough transport module.

2. A dough intermediate transport module as recited in claim 1, wherein said externally extending configuration and said internally arranged configuration have a substantially equivalent geometric pattern.

3. A dough intermediate transport module as recited in claim 1, wherein a plurality of modules are provided as part of a dough intermediate processing line.

4. A dough intermediate transport module as recited in claim 2, wherein said geometric pattern is a hexagon.

5. A dough intermediate transport module as recited in claim 3, wherein said plurality of modules form a honeycomb arrangement.

6. A dough intermediate transport module as recited in claim 1, wherein a plurality of protuberances is provided and extends substantially transversely of said internally arranged configuration.

7. A dough intermediate transport module as recited in claim 6, wherein said pluralities of protuberances are generally rounded.

8. A dough intermediate transport module as recited in claim 1, wherein said internally arranged configuration has a series of generally planar surfaces.

9. A dough intermediate transport module as recited in claim 8, wherein each of said series of generally planar surfaces has a protuberance affixed thereto.

10. A dough intermediate transport module as recited in claim 8, wherein said series of generally planar surfaces has a protuberance on alternate surfaces.

11. A dough intermediate transport module as recited in claim 8, wherein said series of generally planar surfaces has a protuberance on opposing surfaces.

12. A dough intermediate transport module as recited in claim 2, wherein said geometric pattern is a square.

13. A dough intermediate transport module as recited in claim 2, wherein said geometric pattern is a triangle.

14. A dough intermediate transport module as recited in claim 2, wherein said geometric pattern is an octagon.

15. A dough intermediate transport module as recited in claim 2, wherein said geometric pattern is a heptagon.

16. A dough intermediate transport module as recited in claim 8, wherein each of said series of generally planar surfaces has first and second ends.

17. A dough intermediate transport module as recited in claim 16, wherein one of said first and second ends of said series of generally planar surfaces is tapered.

18. A dough intermediate transport module as recited in claim 16, wherein said at least one protuberance is positioned in an area of said series of generally planar surfaces that is not adjacent either of said first and second ends.

19. A dough intermediate transport module, comprising;

a plurality of generally planar surfaces, each of said generally planar surfaces having first and second longitudinally extending side edges, first and second transversely extending end edges and first and second faces;

said generally planar surfaces are connected one to another along one of said first and second longitudinally extending side edges to form a geometric configuration;

at least one protuberance extending substantially perpendicularly from one of said first and second faces of one of said plurality of generally planar surfaces, said protuberance being disposed in an area of said one of said first and second faces that is at least slightly away from one of said first and second transversely extending end edges; and wherein said at least one protuberance aids in retaining a softened dough intermediate in the transport module during processing.

20. A dough intermediate transport module as recited in claim 19, wherein one of said first and second transversely extending end edges is tapered.

21. A dough intermediate transport module as recited in claim 19, wherein said at least one protuberance is slightly rounded.

22. A dough intermediate transport module as recited in claim 19, wherein a protuberance is provided on each of said generally planar surfaces.

23. A dough intermediate transport module as recited in claim 20, wherein said at least one protuberance is provided near said one of said first and second transversely extending edges that is tapered.

24. A dough intermediate transport module as recited in claim 19, wherein said at least one protuberance extends substantially perpendicularly a distance of 1 to 4 mm from said generally planar surface.

* * * * *